United States Patent
Walton et al.

(10) Patent No.: US 10,102,933 B2
(45) Date of Patent: Oct. 16, 2018

(54) CONTROL ROD ASSEMBLY IMPACT LIMITER

(75) Inventors: Lewis A. Walton, Forest, VA (US); Anne R. Austin, Forest, VA (US); Jean H. Raas, Lynchburg, VA (US)

(73) Assignee: BWXT mPower, Inc., Charlotte, NC (US)

(*) Notice: Subject to any disclaimer, the term of this patent is extended or adjusted under 35 U.S.C. 154(b) by 604 days.

(21) Appl. No.: 13/553,023

(22) Filed: Jul. 19, 2012

(65) Prior Publication Data

US 2013/0272464 A1    Oct. 17, 2013

Related U.S. Application Data

(60) Provisional application No. 61/624,034, filed on Apr. 13, 2012.

(51) Int. Cl.
| | |
|---|---|
| *G21C 7/20* | (2006.01) |
| *G21C 7/117* | (2006.01) |
| *G21C 7/14* | (2006.01) |

(52) U.S. Cl.
CPC ............... *G21C 7/20* (2013.01); *G21C 7/117* (2013.01); *G21C 7/14* (2013.01); *Y02E 30/39* (2013.01)

(58) Field of Classification Search
CPC .. G21C 7/20; G21C 7/117; F16F 1/046; F16F 3/02; F16F 3/04; F16F 3/087; F16F 3/0873; F16F 3/0876
USPC .......................................... 376/234; 367/168
See application file for complete search history.

(56) References Cited

U.S. PATENT DOCUMENTS

| | | | | | |
|---|---|---|---|---|---|
| 1,404,464 | A | * | 1/1922 | Meyer ...................... | F16F 3/04 267/170 |
| 3,399,879 | A | * | 9/1968 | Hojo ........................ | F16F 3/04 267/178 |
| 3,503,268 | A | * | 3/1970 | Andrews .................. | G21C 7/12 185/37 |
| 3,762,994 | A | * | 10/1973 | Kunzel ..................... | G21C 7/12 376/234 |

(Continued)

FOREIGN PATENT DOCUMENTS

| | | |
|---|---|---|
| CN | 2134699 Y | 5/1993 |
| CN | 1115483 A | 1/1996 |

(Continued)

OTHER PUBLICATIONS

International Search Report and Written Opinion for PCT/US2013/025801 dated Oct. 29, 2013.

(Continued)

*Primary Examiner* — Sharon M Davis
(74) *Attorney, Agent, or Firm* — Nelson Mullins Riley & Scarborough LLP

(57) ABSTRACT

A control rod assembly including at least one movable control rod including a neutron absorbing material, a control rod drive mechanism (CRDM) for controlling movement of the at least one control rod, and a coupling operatively connecting the at least one control rod and the CRDM. The coupling includes a terminal element engaged with a connecting rod of the CRDM and the at least one moveable control rod, and a kinetic energy absorbing element supported by the terminal element for absorbing kinetic energy during a SCRAM event, the kinetic energy absorbing element configured to act between the terminal element and an upper plate of an associated fuel assembly.

13 Claims, 14 Drawing Sheets

(56) References Cited

U.S. PATENT DOCUMENTS

| | | | |
|---|---|---|---|
| 3,822,439 A * | 7/1974 | Wallin et al. | 74/424.91 |
| 3,980,519 A * | 9/1976 | Taft | 376/225 |
| 4,035,230 A * | 7/1977 | Bevilacqua | 376/225 |
| 4,734,252 A | 3/1988 | Bilibin | |
| 4,826,648 A * | 5/1989 | Savary | G21C 7/20 |
| | | | 376/225 |
| 4,885,127 A | 12/1989 | Yokoyama | |
| 4,895,698 A | 1/1990 | DeMario | |
| 4,923,669 A | 5/1990 | DeMario | |
| 4,957,697 A | 9/1990 | Wada | |
| 4,961,897 A * | 10/1990 | Chevereau | 376/234 |
| 4,966,745 A | 10/1990 | Widener et al. | |
| 4,990,304 A | 2/1991 | Rylatt | |
| 4,994,233 A | 2/1991 | Freeman | |
| 4,996,018 A | 2/1991 | Bhatt et al. | |
| 5,009,837 A | 4/1991 | Nguyen et al. | |
| 5,024,806 A | 6/1991 | Cioffi et al. | |
| 5,030,413 A | 7/1991 | Knierriem et al. | |
| 5,043,134 A | 8/1991 | Widener et al. | |
| 5,068,083 A | 11/1991 | John, Jr. et al. | |
| 5,076,995 A | 12/1991 | Canat | |
| 5,158,740 A | 10/1992 | Boatwright | |
| 5,207,980 A | 5/1993 | Gilmore et al. | |
| 5,265,137 A | 11/1993 | Busch | |
| 5,268,948 A | 12/1993 | Church et al. | |
| 5,282,231 A | 1/1994 | Adams et al. | |
| 5,282,233 A | 1/1994 | Bryan | |
| 5,299,246 A | 3/1994 | Bryan | |
| 5,367,549 A | 11/1994 | Hatfield | |
| 5,420,900 A | 5/1995 | Bougis | |
| 5,436,945 A | 7/1995 | Weisel et al. | |
| 5,513,234 A | 4/1996 | Rottenberg | |
| 5,640,434 A | 6/1997 | Rottenberg | |
| 5,889,832 A * | 3/1999 | Bonnamour et al. | 376/327 |
| 6,055,288 A | 4/2000 | Schwirian | |
| 6,088,420 A | 7/2000 | Yokoyama et al. | |
| 6,130,927 A | 10/2000 | Kang et al. | |
| 6,275,557 B2 | 8/2001 | Nylund et al. | |
| 6,636,578 B1 | 10/2003 | Clark | |
| 6,636,580 B2 | 10/2003 | Murakami et al. | |
| 6,738,447 B1 | 5/2004 | Sparrow et al. | |
| 6,810,099 B2 | 10/2004 | Nakamaru et al. | |
| 6,819,733 B2 | 11/2004 | Broders et al. | |
| 6,865,242 B2 | 3/2005 | Barbe et al. | |
| 6,895,067 B2 | 5/2005 | Borum et al. | |
| 7,085,340 B2 | 8/2006 | Goldenfield et al. | |
| 7,257,185 B1 | 8/2007 | Yamada et al. | |
| 7,280,946 B2 | 10/2007 | Russell, II et al. | |
| 7,424,412 B2 | 9/2008 | Kropaczek et al. | |
| 7,428,479 B2 | 9/2008 | Boer et al. | |
| 7,453,972 B2 | 11/2008 | Hellandbrand, Jr. et al. | |
| 7,526,058 B2 | 4/2009 | Fawcett et al. | |
| 7,548,602 B2 | 6/2009 | Smith, III et al. | |
| 7,561,654 B2 | 7/2009 | Makovicka et al. | |
| 7,574,337 B2 | 8/2009 | Kropaczek et al. | |
| 7,668,280 B2 | 2/2010 | Hellandbrand, Jr. et al. | |
| 7,668,284 B2 | 2/2010 | Sparrow et al. | |
| 8,532,246 B2 | 9/2013 | Pomirleanu et al. | |
| 2003/0123600 A1 | 7/2003 | Hesketh et al. | |
| 2003/0169839 A1 | 9/2003 | Matteson | |
| 2003/0216872 A1 | 11/2003 | Sridhar et al. | |
| 2005/0069080 A1 | 3/2005 | Goldenfield et al. | |
| 2006/0153327 A1 | 7/2006 | Jiang | |
| 2006/0222140 A1 | 10/2006 | Aleshin et al. | |
| 2006/0251205 A1 | 11/2006 | Balog | |
| 2007/0133732 A1 | 6/2007 | Nakayama et al. | |
| 2007/0206717 A1 | 9/2007 | Conner et al. | |
| 2008/0084957 A1 | 4/2008 | Aleshin et al. | |
| 2009/0032178 A1 | 2/2009 | Feinroth | |
| 2011/0024959 A1 * | 2/2011 | Chang | F16F 1/32 |
| | | | 267/137 |
| 2011/0222640 A1 * | 9/2011 | DeSantis | G21C 7/14 |
| | | | 376/229 |
| 2012/0051482 A1 | 3/2012 | Shargots et al. | |

FOREIGN PATENT DOCUMENTS

| | | |
|---|---|---|
| CN | 101369468 A | 2/2009 |
| DE | 1286653 | 1/1969 |
| WO | 2012047473 | 4/2012 |

OTHER PUBLICATIONS

European Extended Search Report dated Jan. 13, 2016 for EP Application No. 13787598.5.

Office Action dated Apr. 8, 2016 for Chinese Application No. 201310119945.0.

* cited by examiner

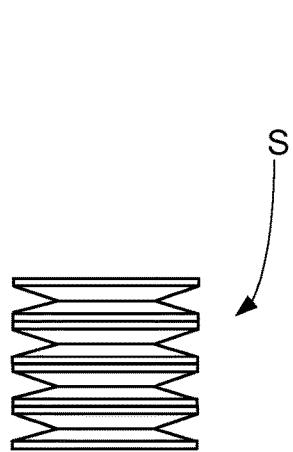
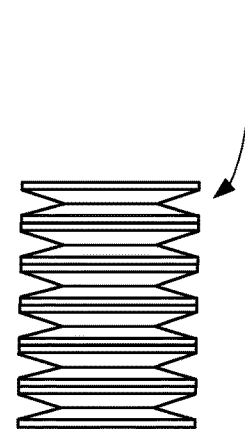
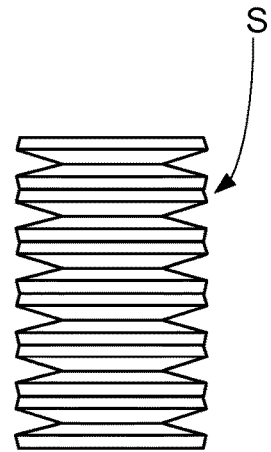
FIG.14A  FIG. 14B  FIG.14C
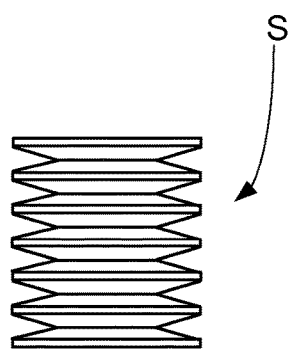
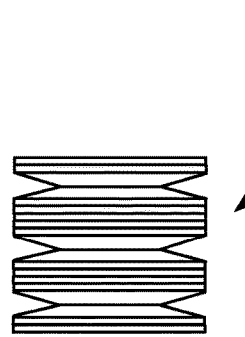
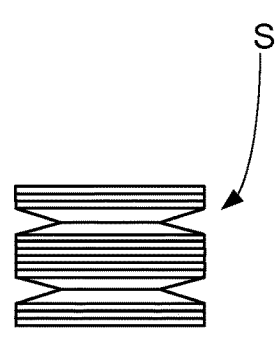
FIG.14D  FIG. 14E  FIG.14F

CONTROL ROD ASSEMBLY IMPACT LIMITER

This application claims the benefit of U.S. Provisional Application No. 61/624,034 filed Apr. 13, 2012. U.S. Provisional Application No. 61/624,034 filed Apr. 15, 2012 is incorporated herein by reference in its entirety.

BACKGROUND

The following relates to the nuclear power reactor arts, nuclear reaction control apparatus arts, control rod assembly arts, and related arts.

In thermal nuclear power plants, a nuclear reactor core comprises a fissile material having size and composition selected to support a desired nuclear fission chain reaction. The core is disposed in a pressure vessel immersed in primary coolant water. It is further known to control or stop the reaction by inserting "control rods" comprising a neutron-absorbing material into guide tubes passing through the reactor core. When inserted, the control rods absorb neutrons so as to slow or stop the chain reaction.

The control rods are operated by control rod drive mechanisms (CRDMs). In so-called "regulating" control rods, the insertion of the control rods is continuously adjustable so as to provide continuously adjustable reaction rate control. In so-called "shutdown" control rods, the insertion is either fully in or fully out. During normal operation the shutdown rods are fully retracted from the reactor core; during a SCRAM, the shutdown rods are rapidly fully inserted so as to rapidly stop the chain reaction. Control rods can also be designed to perform both regulating and shutdown rod functions. In some such dual function control rods, the control rod is configured to be detachable from the CRDM in the event of a SCRAM, such that the detached control rod falls into the reactor core under the influence of gravity. In some systems, such as naval systems, a hydraulic pressure or other positive force (other than gravity) is also provided to drive the detached control rod into the core.

To complete the control system, a control rod/CRDM coupling is provided. A known coupling includes a connecting rod having a lower end at which a spider is secured. The upper portion of the connecting rod operatively connects with the CRDM. In regulating rods, this connection includes a lead screw or other incremental adjustment element. Conventionally, the lead screw scrams with the connecting rod, spider, and control rods as a translating assembly (also known as the "control rod assembly"). In some known approaches, however, the lead screw may be retained in the CRDM such that only the connecting rod scrams. See, e.g. U.S. Pub. No. 2010-0316177 A1 published Dec. 16, 2010 which is incorporated herein by reference in its entirety, and U.S. Pub. No. 2011-0222640 A1 published Sep. 15, 2011 which is incorporated herein by reference in its entirety. To reduce cost and overall system complexity, a single CRDM is typically connected with a plurality of control rods via a spider. In this arrangement, all the control rods coupled with a single spider together as a translating control rod assembly (CRA). In practice a number of CRDM units are provided, each of which is coupled with a plurality of control rods via a spider, so as to provide some redundancy. The spider extends laterally away from the lower end of the connecting rod to provide a large "surface area" for attachment of multiple control rods.

The translating CRA (including the control rods, spider, connecting rod, and optionally also the lead screw) represents a substantial mass that falls under the force of gravity during a scram. It is advantageous for the translating CRA to have substantial mass in order to provide the driving force for the scram. In some designs, the translating CRA has a mass of a hundred pounds to a few hundred pounds, and may reach a terminal velocity of 10 feet per second or higher. Thus, consideration is given to the termination of the scram, that is, to the slowing and stopping of the downward falling of the translating assembly at the end of the scram event.

Prior to termination of the scram, the descending control rod tips engage dashpot tubes of narrowed inner diameter that produce a slowing force via a piston effect. Alternatively, a dashpot can be located in the CRDM which engages with the descending connecting rod or lead screw. Although such dashpots can provide some cushioning, the ultimate "stop" for the scram is impact of the descending spider onto the top of the fuel assembly (or onto a structural plate located above the fuel assembly). To cushion this final impact, it is known to employ one or more helical springs disposed in the connecting rod and/or spider. However, it is difficult to insert long springs into the translating CRA, and shorter springs do not provide large energy absorption. As a consequence, a substantial portion of the kinetic energy of the translating CRA is ultimately absorbed by the impact of the spider onto the fuel assembly, which can lead to damage to these critical components.

BRIEF SUMMARY

In one aspect of the disclosure, a control rod assembly comprises at least one movable control rod including a neutron absorbing material, a connecting rod configured for connection to an associated control rod drive mechanism (CRDM) for controlling movement of the at least one control rod, and a coupling operatively connecting the at least one control rod and the connecting rod. The coupling includes a spider engaged with the connecting rod and the at least one moveable control rod, and a kinetic energy absorbing element supported by the spider for absorbing kinetic energy during a SCRAM event, the kinetic energy absorbing element configured to act between the spider and an associated impact surface.

The spider can include a casing having an upper surface and a lower surface, and the kinetic energy absorbing element can include a plunger mounted to the spider for reciprocating movement parallel to a SCRAM direction, and can further include at least one Belleville washer interposed between the casing and the plunger for biasing the plunger away from the top surface of the casing. The spider can be a heavy spider that is elongate in the SCRAM direction, and the at least one Belleville washer can be contained within the spider. The heavy spider can include a first portion comprising a first material having a first density and a second portion comprising a second material having a second density that is greater than the first density.

The connecting rod can be detachably engagable with the associated CRDM such that detachment of the spider causes a translating assembly including at least the connecting rod, the spider and the at least one control rod to fall toward a reactor core disposed in a lower region of the nuclear reactor pressure vessel, and whereby the kinetic energy absorbing element is configured to absorb at least some of the kinetic energy of the translating assembly during impact with the reactor core. The coupling can include a J-Lock coupling for connecting the spider with a lower end of the connecting rod, the J-Lock coupling can be supported in a central bore of the spider extending between the upper and lower surface of the casing, the J-Lock coupling can include a spring, and the Belleville washer can be coaxially aligned with said spring of the J-Lock coupling. The spring of the J-Lock coupling and the Belleville washer can be axially coextensive along a portion of their respective lengths.

In another aspect of the disclosure, an apparatus comprises a spider connectable with a lower end of an associated connecting rod of an associated CRDM and with upper ends of a plurality of associated control rods, and a kinetic energy absorbing element including at least one Belleville washer supported by the terminal element for absorbing kinetic energy during a SCRAM event.

In another aspect of the disclosure, a control rod assembly comprises: a spider; a plurality of mutually parallel control rods connected with the spider, the control rods including neutron absorbing material; a connecting rod having an end connected with the spider and configured for detachable connection to an associated control rod drive mechanism (CRDM) wherein responsive to detachment of said connection to the associated CRDM the control rod assembly undergoes a scram event in which the control rod assembly descends under force of gravity; and a stack of Belleville washers disposed in at least one of the connecting rod and the spider, the stack of Belleville washers arranged to absorb kinetic energy of a descent terminating impact of the control rod assembly during a SCRAM event. In some such embodiments the stack of Belleville washers is disposed in a central bore of the spider.

In another aspect of the disclosure, an apparatus comprises: a spider configured to support a plurality of mutually parallel control rods; and a kinetic energy absorbing element disposed at least partially in a central bore of the spider and including a plunger arranged to stop descent of the spider during a SCRAM event with kinetic energy developed during the SCRAM event being absorbed by the kinetic energy absorbing element disposed in the central bore of the spider. In some embodiments the kinetic energy absorbing element further comprises a stack of Belleville washers disposed in a central bore of the spider. In some such embodiments the stack of Belleville washers does not extend outside of the central bore of the spider.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

FIGS. 14a-14f illustrate various Belleville washer stacks that can be utilized to achieve various spring constants and plunger stroke lengths.

DETAILED DESCRIPTION OF THE PREFERRED EMBODIMENTS

In existing control rod assemblies, a plurality of control rods connect with a lightweight, "spidery" spider having a minimal weight and surface area oriented broadside to the SCRAM direction. The spider is configured to provide a large "effective" area for attachment of control rods, but a small "actual" area contributing to hydraulic resistance during SCRAM. Both the spider and the connecting rod are stainless steel components so as to provide benefits such as strength and robustness, low cost, manufacturability, and compatibility with the reactor vessel environment.

Disclosed herein are control rod assemblies that include one or both of the following aspects: (i) replacement of the conventional lightweight spider with a "heavy" spider that serves as a terminal weighting element, and/or (ii) replacement of a substantial portion of the stainless steel of the spider and/or connecting rod with a denser material such as tungsten (optionally in a powdered or granulated form), molybdenum, tantalum, or so forth. The disclosed control rod assemblies are substantially heavier than conventional control rod assemblies of the same vertical dimensions, which advantageously enhances the speed and reliability of gravitationally-induced SCRAM.

In the case of control rod assemblies employing the disclosed heavy spider as a terminal weighting element, the increased weight provided by the heavy spider as compared with a conventional lightweight spider enables the heavy spider to optionally have a larger actual surface area broadside to the SCRAM direction (for example, in order to provide the additional weight) as compared with the conventional spider. In addition, the heavier than conventional control rod assemblies disclosed herein also include a kinetic energy absorbing element for absorbing kinetic energy during a scram event. The kinetic energy absorbing elements disclosed herein act to limit the impact of the spider with the "stopping" surface or component, such as a top plate fitting of a fuel assembly. As disclosed herein, special spring elements/arrangements are used to accommodate the kinetic load. In one example, a stack of Belleville washers is used. It will be appreciated that aspects of the disclosure relating to the kinetic energy absorbing element are also applicable to control rod assemblies with conventional light-weight spiders. For example, the disclosed kinetic energy absorbing element is useful with a conventional control rod assembly that uses a lightweight spider but includes relatively long (and hence massive) control rods and/or a long connecting rod.

Figure 1:
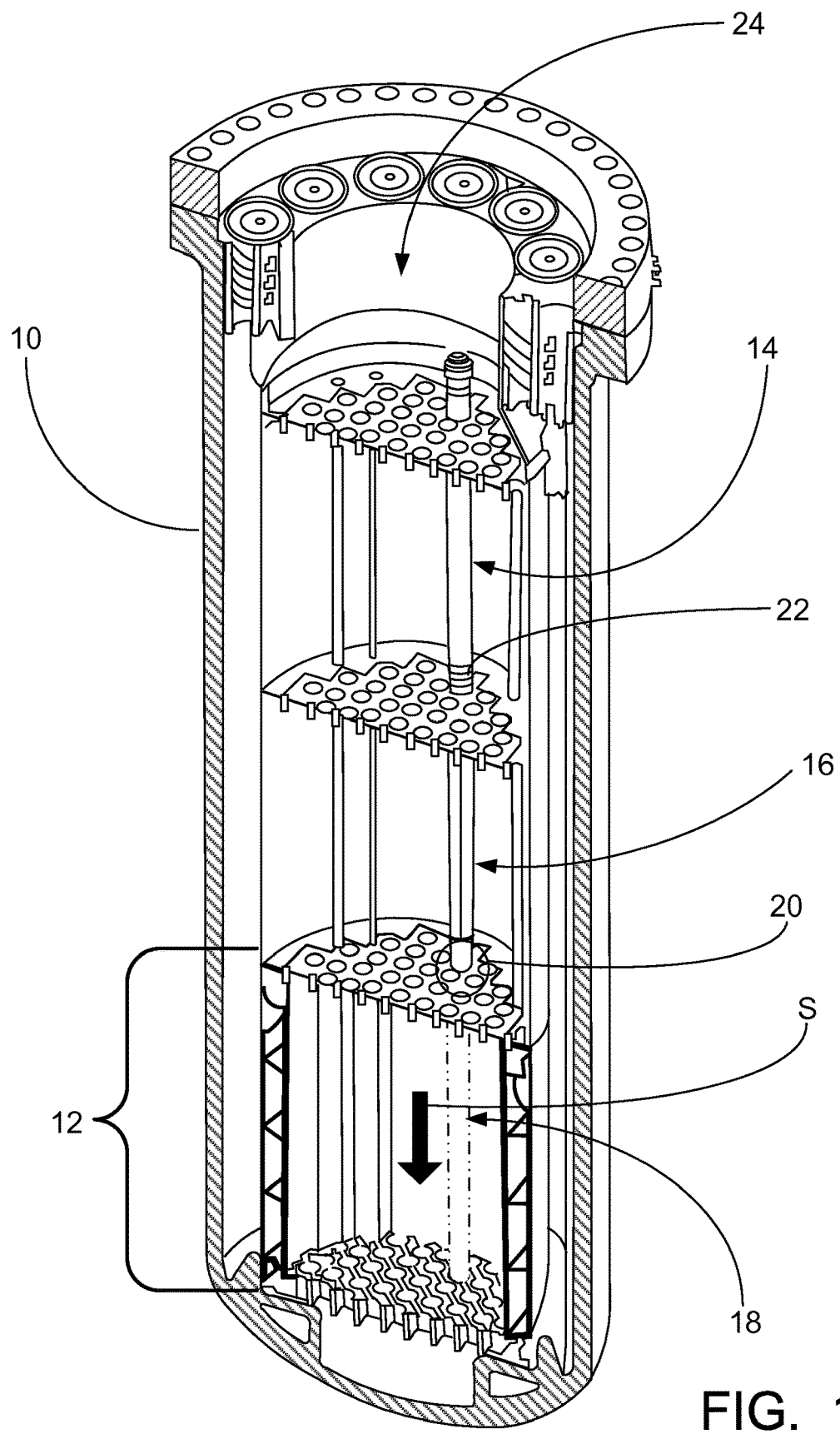
FIG. 1 diagrammatically shows a perspective sectional view a lower portion of an illustrative nuclear reactor pressure vessel including an illustrative control rod assembly (CRA).

With reference to FIG. 1, a relevant portion of an illustrative nuclear reactor pressure vessel 10 includes a reactor core 12 located proximate to a bottom of the pressure vessel 10. The core 12 includes or contains radioactive material (not shown) such as, by way of illustrative example, enriched uranium oxide (that is, $UO_2$ processed to have an elevated $^{235}U/^{238}U$ ratio). A control rod drive mechanism (CRDM) unit 14 is diagrammatically illustrated. The illustrative CRDM 14 is an internal CRDM that is disposed within the pressure vessel 10; alternatively, an external CRDM may be employed. FIG. 1 shows the single illustrated CRDM unit 14 as an illustrative example; however, more generally there are typically multiple CRDM units each coupled with a different plurality of control rods (although these additional CRDM units are not shown in FIG. 1, the pressure vessel 10 is drawn showing the space for such additional CRDM units).

Below the CRDM unit 14 is a control rod guide frame 16, which in the perspective view of FIG. 1 blocks from view the control rod/CRDM coupling assembly (i.e., the spider and connecting rod, both not shown in FIG. 1). Extending below the guide frame 16 is a plurality of control rods 18. FIG. 1 shows the control rods 18 in their fully inserted position in which the control rods 18 are maximally inserted into the core 12. In the fully inserted position, the spider is located at a lower location 20 within the control rod guide frame 16 (and, again, hence not visible in FIG. 1). In the illustrative embodiment of FIG. 1, the CRDM unit 14 and the control rod guide frame 16 are spaced apart by a standoff 22 comprising a hollow tube having opposite ends coupled with the CRDM unit 14 and the guide frame 16, respectively, and through which the connecting rod (not shown in FIG. 1) passes.

FIG. 1 shows only a lower portion of the illustrative pressure vessel 10. In an operating nuclear reactor, an open upper end 24 of the illustration is connected with one or more upper pressure vessel portions that together with the illustrated lower portion of the pressure vessel 10 forms an enclosed pressure volume containing the reactor core 12, the control rods 18, the guide frame 16, and the internal CRDM unit 14. In an alternative embodiment, the CRDM unit is external, located above the reactor pressure vessel. In such embodiments, the external CRDM is connected with the control rods by a control rod/CRDM coupling assembly in which the connecting rod extends through a portal in the upper portion of the pressure vessel.

Figure 2:
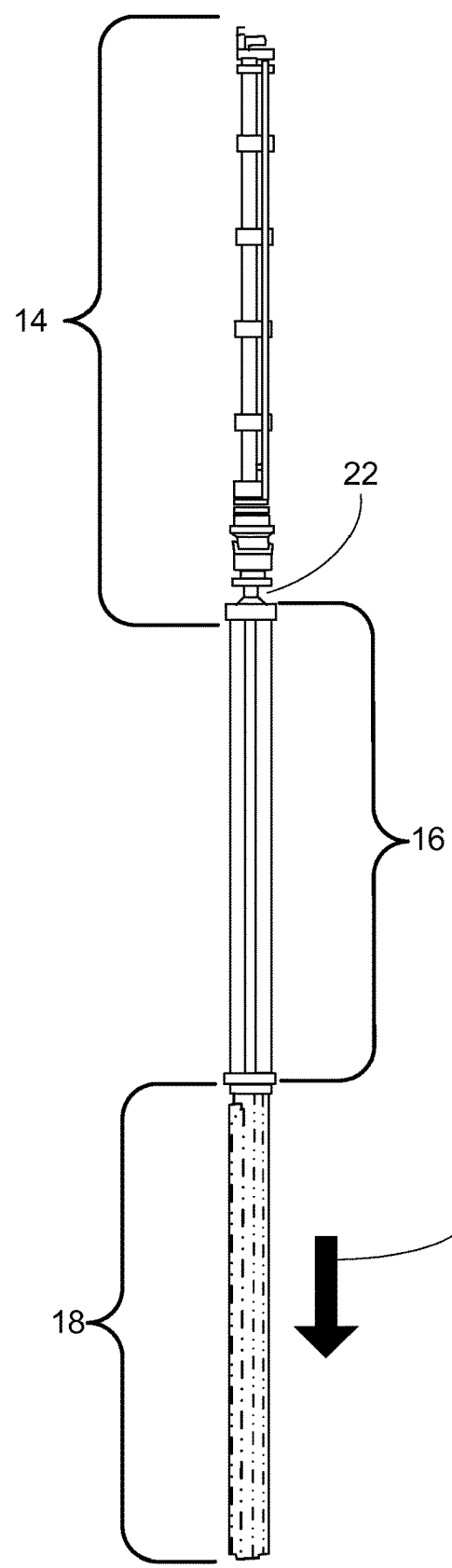
FIG. 2 diagrammatically shows a perspective view of the illustrative CRA of FIG. 1.

With reference to FIG. 2, the control assembly including the CRDM unit 14, the control rod guide frame 16, the intervening standoff 22, and the control rods 18 is illustrated isolated from the reactor pressure vessel. Again, the control rod/CRDM coupling assembly is hidden by the control rod guide frame 16 and the standoff 22 in the view of FIG. 2.

Figure 3:
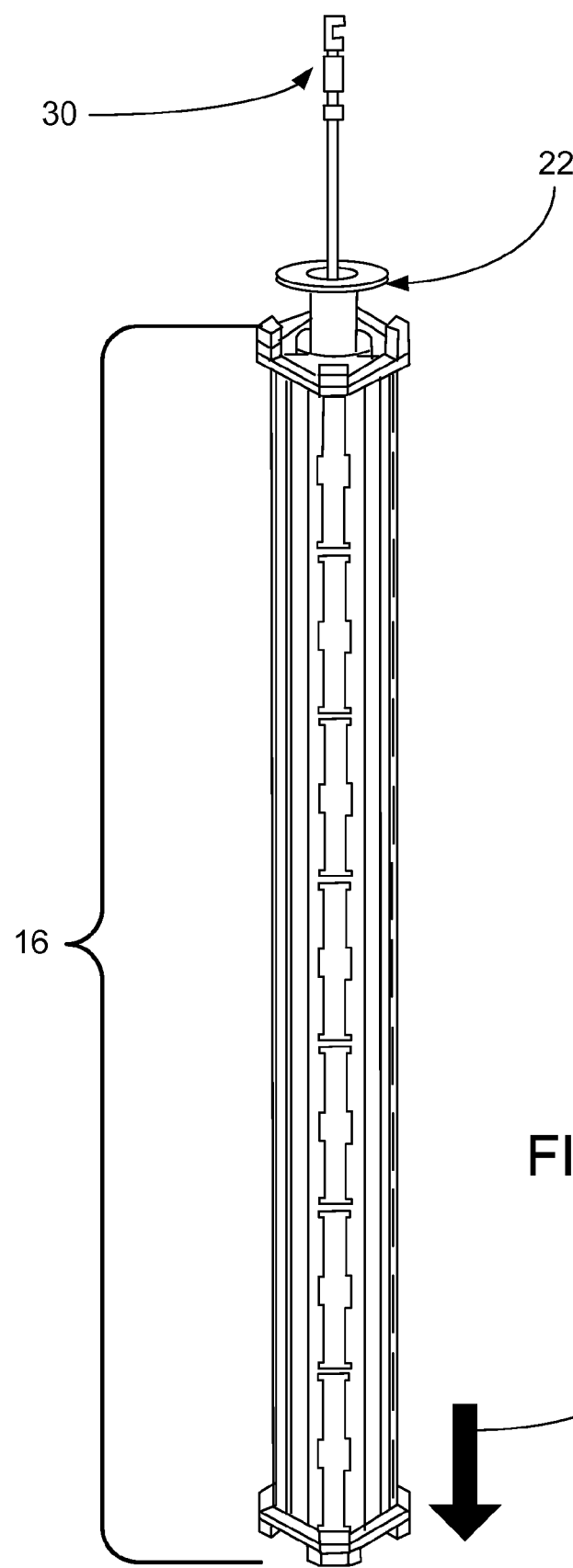
FIG. 3 diagrammatically shows a perspective view of the control rod guide frame with the CRDM unit removed so as to reveal an upper end of a connecting rod of the CRA.

With reference to FIG. 3, the control rod guide frame 16 and the standoff 22 is again illustrated, but with the CRDM unit removed so as to reveal an upper end of a connecting rod 30 extending upwardly above the standoff 22. If the CRDM unit has regulating rod functionality, then this illustrated upper end of the connecting rod 30 engages with the CRDM unit to enable the CRDM unit to raise or lower the control rod 30 and, hence, the attached control rods 18 (not shown in FIG. 3). If the CRDM unit has shutdown rod functionality, then this illustrated upper end is detachable from the CRDM unit during SCRAM. In each of FIGS. 1-4, a SCRAM direction S is indicated, which is the downward direction of acceleration of the falling control rods in the event of a SCRAM.

Figure 4:
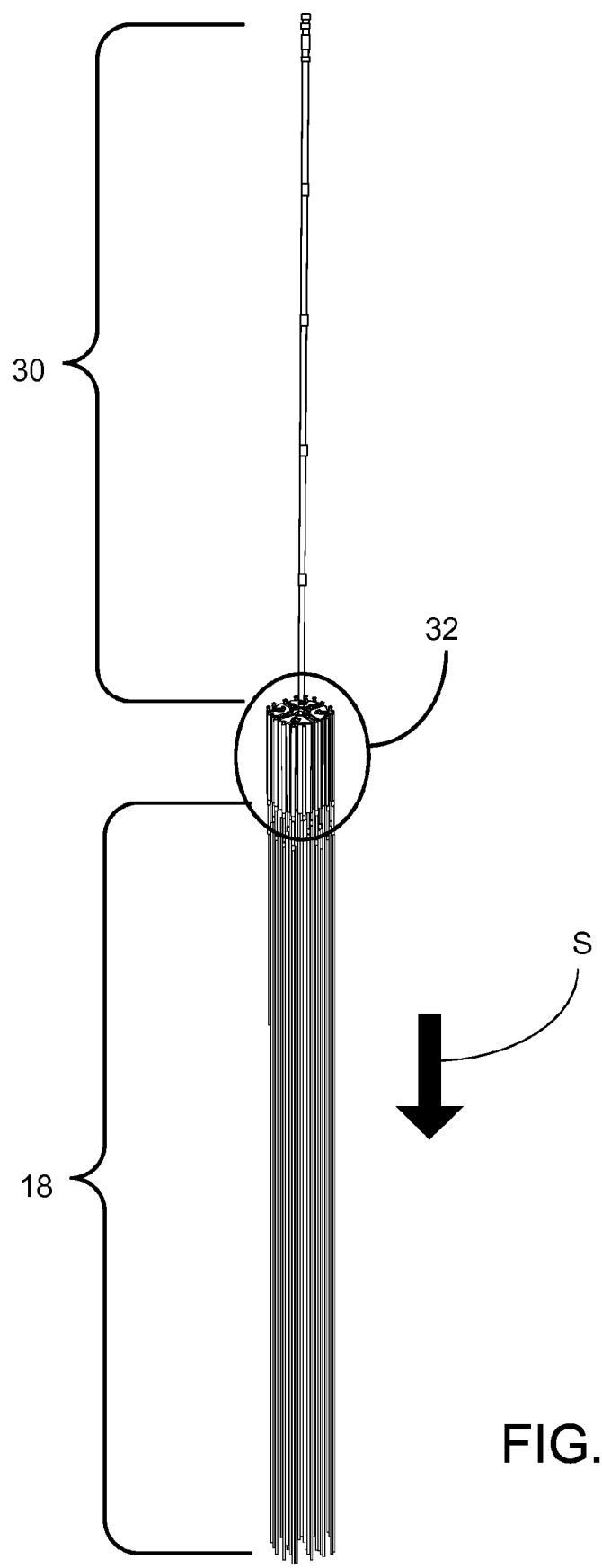
FIG. 4 diagrammatically shows a perspective view the control rods and the connecting rod of the CRA of FIGS. 1-3, with components that would occlude the view of these components removed.

With reference to FIG. 4, the control rods 18 and the connecting rod 30 are shown without any of the occluding components (e.g., without the guide frame, standoff, or CRDM unit). In the view of FIG. 4 an illustrative terminal weighting element or "heavy" spider 32 is visible, which provides connection of the plurality of control rods 18 with the lower end of the connecting rod 30. It will be noticed that, unlike a conventional spider, the heavy spider 32 has substantial elongation along the SCRAM direction S. The illustrated heavy spider 32 has the advantage of providing enhanced weight which facilitates rapid SCRAM; however, it is also contemplated to replace the illustrated terminal weighting element 32 with a conventional "spidery" spider.

Figure 5:
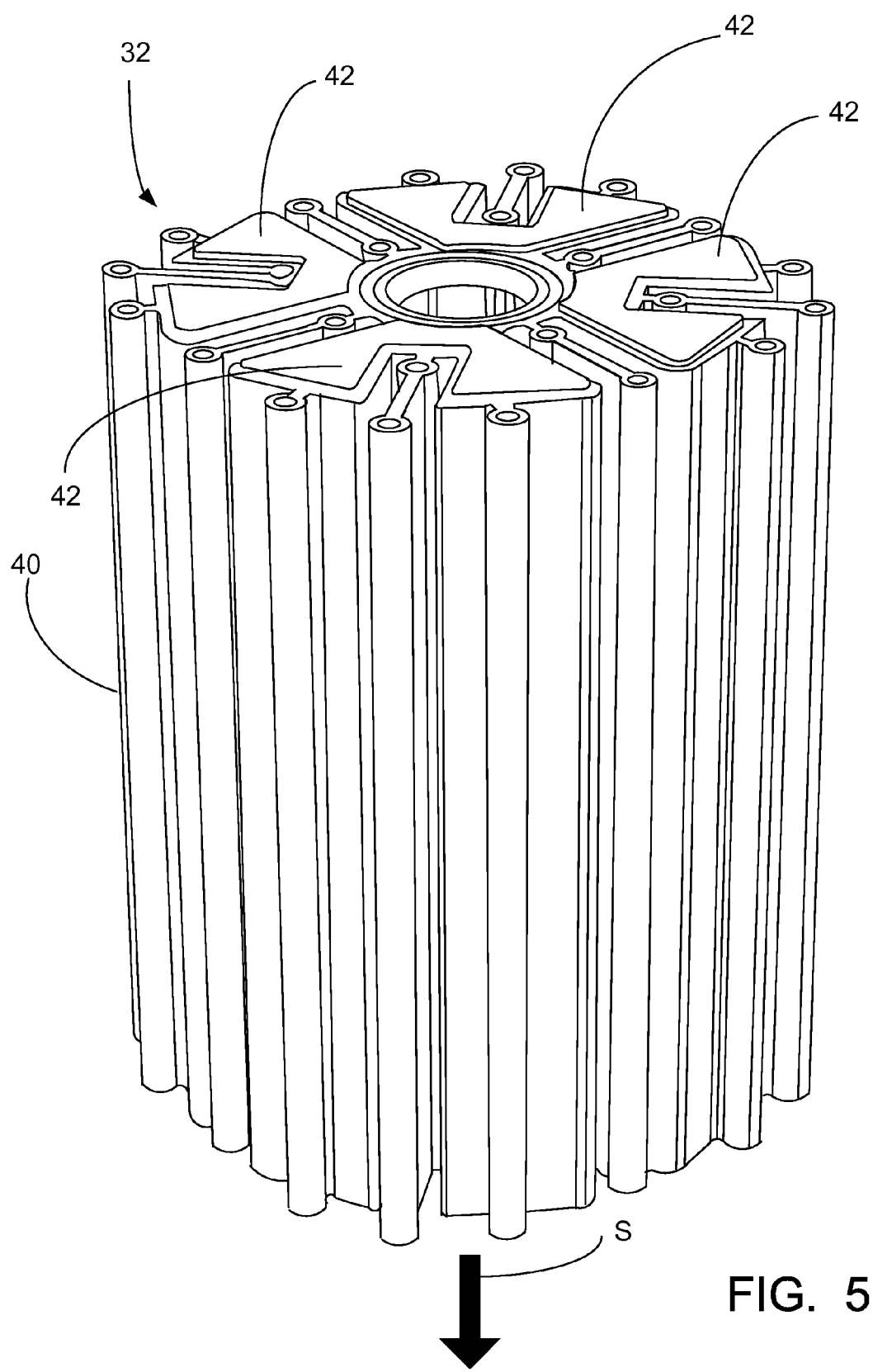
FIG. 5 diagrammatically shows a perspective view of the terminal weighting element of the CRA of FIGS. 1-4.
Figure 6:
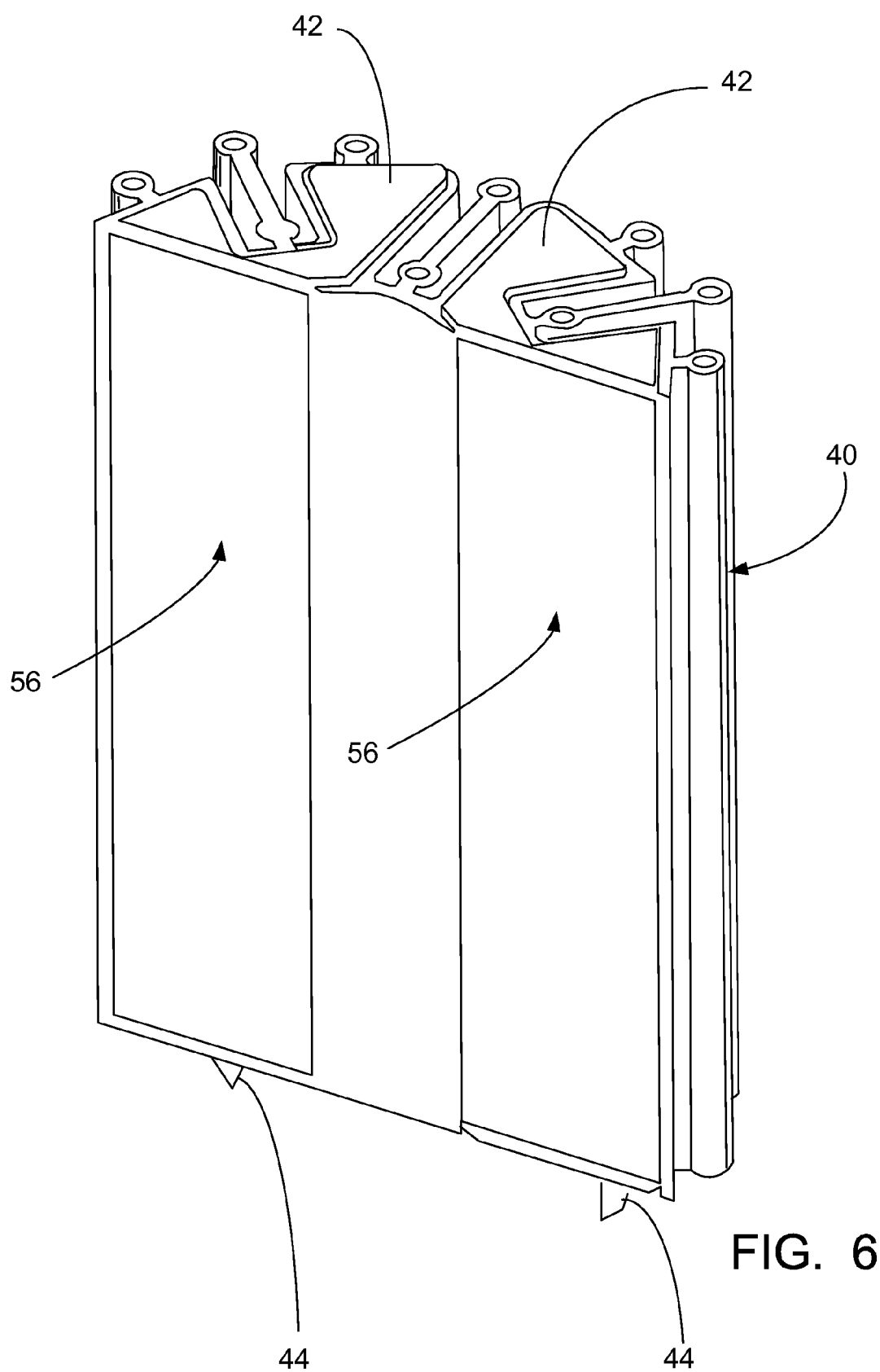
FIG. 6 diagrammatically shows a perspective sectional view of the terminal weighting element of FIG. 5.

With reference to FIGS. 5 and 6, a perspective view and a side-sectional perspective view, respectively, of the heavy spider 32 is shown. The heavy spider 32 includes a substantially hollow casing 40 having upper and lower ends that are sealed off by upper and lower casing cover plates (surfaces) 42, 44. Four upper casing cover plates 42 are illustrated in FIG. 5 and two of the upper casing cover plates 42 are shown in the side-sectional perspective view of FIG. 6. The tilt of the perspective view of FIG. 5 occludes the lower cover plates from view, but two of the lower cover plates 44 are visible "on-edge" in the side-sectional view of FIG. 6. The illustrative heavy spider 32 includes four lower casing cover plates 44 arranged analogously to the four upper casing cover plates 42 illustrated in FIG. 5.

Figure 7:
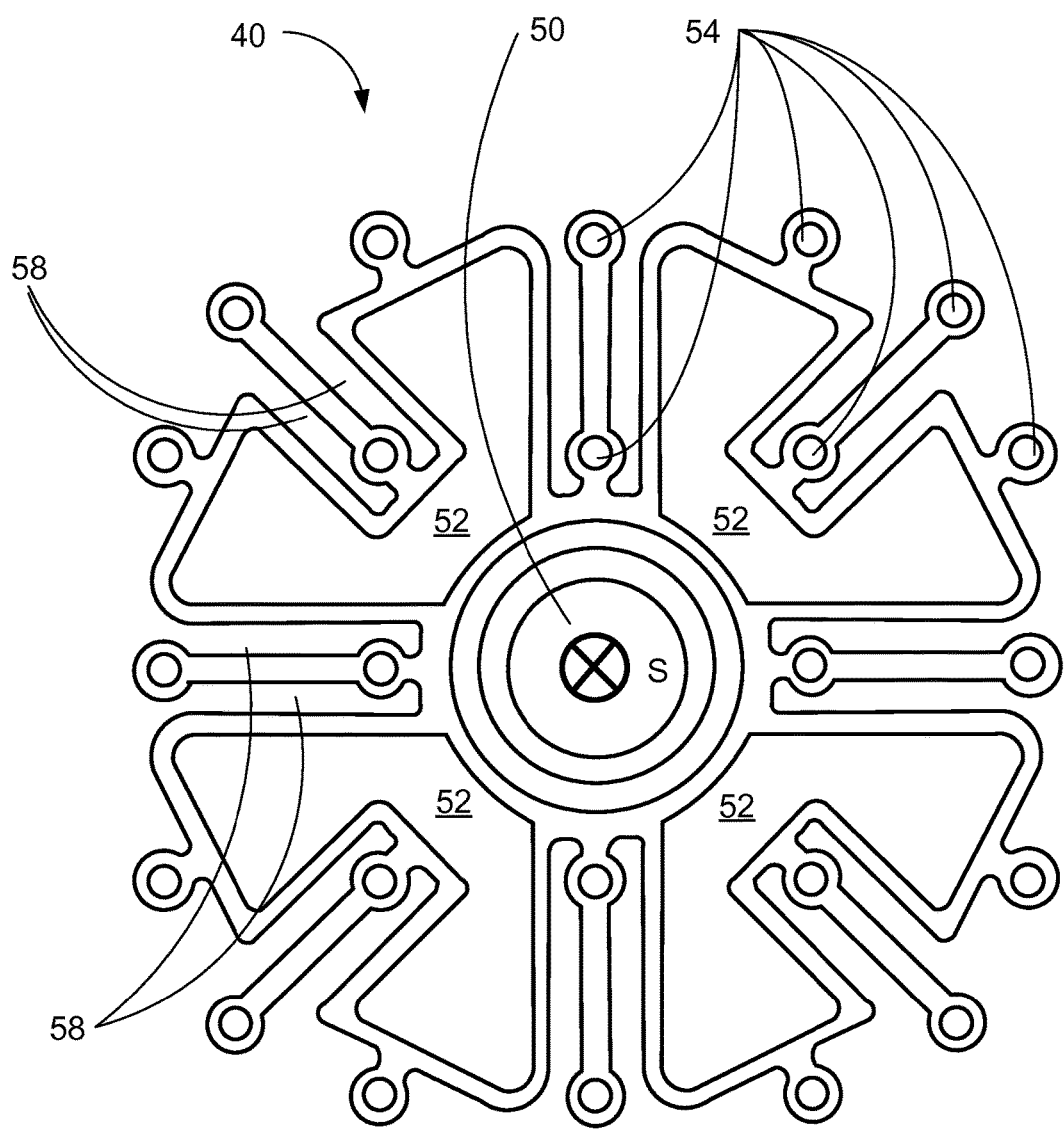
FIG. 7 diagrammatically shows a top view of a casing of the terminal weighting element of FIGS. 5 and 6.

Further visualization of the illustrative heavy spider 32 is provided by FIG. 7, which shows a top view of the hollow casing 40 with the cover plates omitted. As seen in FIG. 7, the hollow casing 40 is cylindrical having a cylinder axis parallel with the SCRAM direction S and a uniform cross-section transverse to the cylinder axis. That cross-section is complex, and defines a central passage 50 and four cavities 52 spaced radially at 90° intervals around the central passage 50. The cross-section of the hollow casing 40 also defines twenty-four small passages 54 (that is, small compared with the central passage 50), of which only some of the twenty-four small passages 54 are expressly labeled in FIG. 7.

The four cavities 52 spaced radially at 90° intervals around the central passage 50 are next considered. The substantially hollow casing 40 and the upper and lower cover plates 42, 44 are suitably made of stainless steel, although other materials are also contemplated. The upper and lower cover plates 42, 44 seal the four cavities 52. As shown in the side-sectional view of FIG. 6, the four cavities 52 are filled with a filler 56 comprising a heavy material, where the term "heavy material" denotes a material that has a higher density than the stainless steel (or other material) that forms the hollow casing 40. For example, the filler 56 may comprise a heavy material such as tungsten (optionally in a powdered or granulated form), depleted uranium, molybdenum, or tantalum, by way of some illustrative examples. By way of illustrative example, stainless steel has a density of about 7.5-8.1 grams/cubic centimeter, while tungsten has a density of about 19.2 grams/cubic centimeter and tantalum has a density of about 16.6 grams per cubic centimeter. In some preferred embodiments, the heavy material comprising the filler 56 has a density that is at least twice the density of the material comprising the casing 40. In some preferred embodiments in which the casing 40 comprises stainless steel, the heavy material comprising the filler 56 preferably has a density that is at least 16.2 grams per cubic centimeter. (All quantitative densities specified herein are for room temperature.)

In some embodiments, the filler 56 does not contribute to the structural strength or rigidity of the heavy spider 32. Accordingly, heavy material comprising the filler 56 can be selected without consideration of its mechanical properties. For the same reason, the filler 56 can be in the form of solid inserts sized and shaped to fit into the cavities 52, or the filler 56 can be a powder, granulation, or other constitution. The cover plates 42, 44 seal the cavities 52, and so it is also contemplated for the heavy material comprising the filler 56 to be a material that is not compatible with the primary coolant flowing in the pressure vessel 10. Alternatively, if the heavy material comprising the filler 56 is a material that is compatible with the primary coolant flowing in the pressure vessel 10, then it is contemplated to omit the upper cover plates 42, in which case the cavities 52 are not sealed. Indeed, if the filler 56 is a solid material securely held inside the cavities 52, then it is contemplated to omit both the upper cover plates 42 and the lower cover plates 44.

Figure 8:
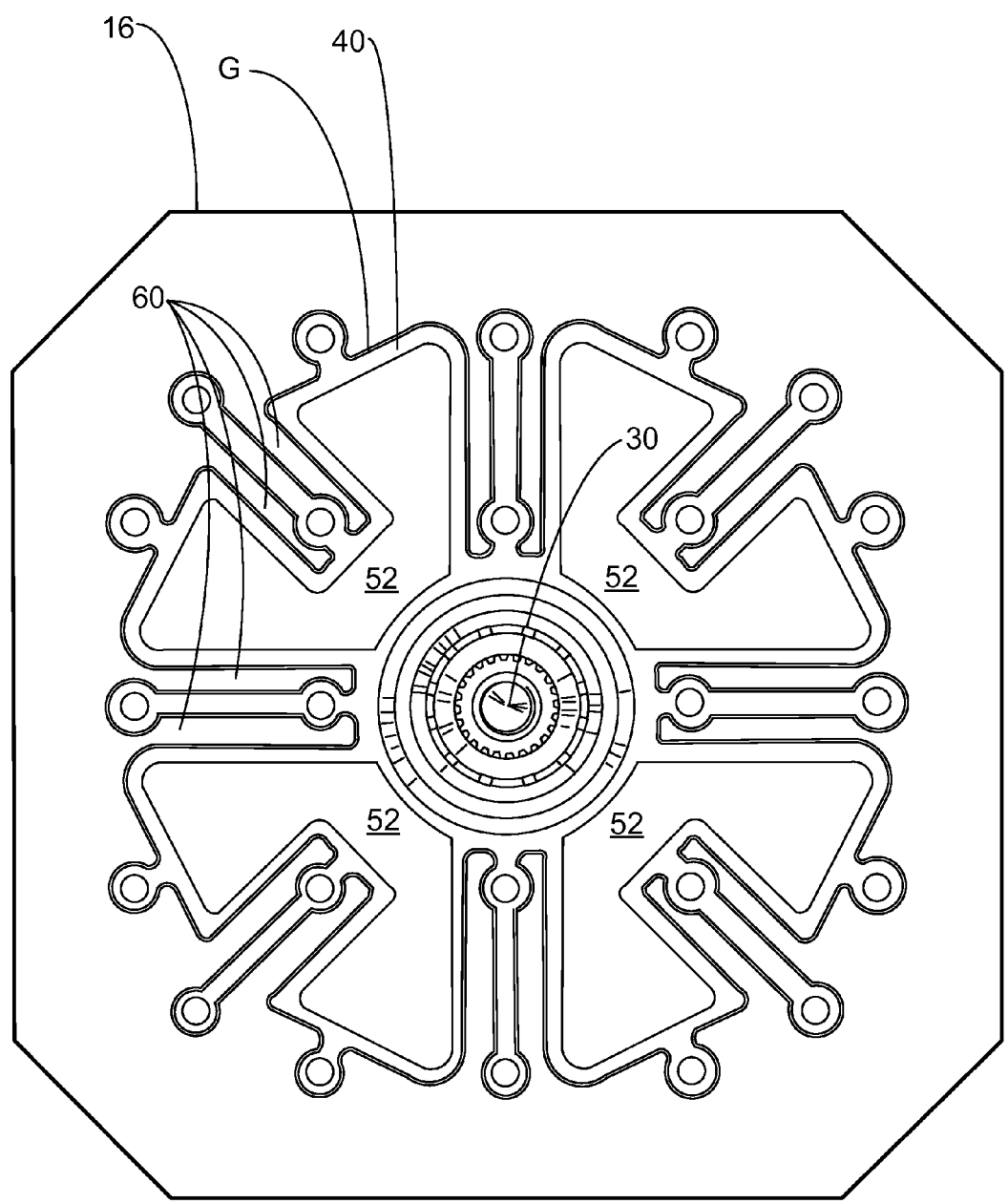
FIG. 8 diagrammatically shows a top view of the casing of the terminal weighting element of FIGS. 5-7 located in the control rod guide frame of the CRA of FIGS. 1-3.

With continuing reference to FIGS. 5-7 and with further reference to FIG. 8, the heavy spider 32 passes through the control rod guide frame 16 as the control rods 18 are raised or lowered by action of the CRDM unit 14. The cylindrical configuration with constant cross-section over the length of the heavy spider 32 along the SCRAM direction S simplifies this design aspect. Moreover, the control rod guide frame 16 should cam against each control rod 18 to provide the desired control rod guidance. Toward this end, the cross-section of the heavy spider 32 is designed with recesses 58 (some of which are labeled in FIG. 7). As shown in FIG. 8, into these recesses 58 fit mating extensions 60 of the control rod guide frame 16. A gap G also indicated in FIG. 8 provides a small tolerance between the outer surface of the heavy spider 32 and the proximate surface of the control rod guide frame 16. The twenty-four partial circular openings of the guide frame 16 which encompass the twenty-four small passages 54 of the heavy spider 32 are sized to cam against the control rods 18. For completeness, FIG. 8 also shows the connecting rod 30 disposed inside the central passage 50 of the heavy spider 32.

FIGS. 5-7 show that providing space for the four cavities 52 substantially increases the actual cross-sectional area of the heavy spider 32 (that is, the area arranged broadside to the SCRAM direction S), as compared with the actual cross-sectional area that could be achieved without these four cavities 52. In some embodiments, the "fill factor" for the cross-section oriented broadside to the SCRAM direction S (including the area encompassed by the cover plates 42, 44) is at least 50%, and FIG. 7 demonstrates that the fill factor is substantially greater than 50% for the illustrative terminal weighting element. Thus, the design of the heavy spider 32 is distinct from the "spidery" design of a typical spider, which is optimized to minimize the actual surface area broadside to the SCRAM direction S and generally has a fill factor of substantially less than 50% in order to reduce hydraulic resistance. In general, the SCRAM force achieved by the weight of the heavy spider 32 more than offsets the increased hydraulic resistance of the greater actual broadside surface area imposed by the four cavities 52.

Additional weight to overcome the hydraulic resistance and enhance SCRAM speed is obtained by elongating the heavy spider 32 in the SCRAM direction S as compared with a conventional spider. Said another way, a ratio of a length of the heavy spider 32 in the SCRAM direction S versus the largest dimension oriented broadside to the SCRAM direction S is optionally equal to or greater than one, and is more preferably equal to or greater than 1.2. The illustrative heavy spider 32 is not a generally planar element as per a typical spider, but rather is a volumetric component that provides substantial terminal weight to the lower end of the connecting rod 30.

Another advantage of the elongation of the heavy spider 32 in the SCRAM direction S is that it optionally allows for streamlining the heavy spider 32 in the SCRAM direction S. This variation is not illustrated; however, it is contemplated to modify the configuration of FIG. 5 (by way of illustrative example) to have a narrower lower cross-section and a broader upper cross section, with a conical surface of increasing diameter running from the narrower lower cross-section to the broader upper cross section. The small passages 54 for securing the control rods would remain oriented precisely parallel with the SCRAM direction S (and, hence, would be shorter for control rods located at the outermost positions). Such streamlining represents a trade-off between hydraulic resistance (reduced by the streamlining) and weight reduction caused by the streamlining.

The illustrative heavy spider 32 provides a desired weight by a combination of the filler 56 comprising a heavy material (which increases the average density of the heavy spider 32 to a value greater than the average density of stainless steel) and the elongation of the heavy spider 32 (which increases the total volume of the heavy spider 32).

In some embodiments, it is contemplated to omit the filler material entirely, and instead to rely entirely upon elongation to provide the desired weight. For example, the illustrated heavy spider 32 can be modified by omitting the four cavities 52 and the filler 56. In this configuration the casing 40 can be replaced by a single solid stainless steel element having the same outer perimeter as the casing 40, with the top and bottom of the single solid stainless steel element defining (or perhaps better stated, replacing) the upper and lower casing cover plates 42, 44.

Various embodiments of the disclosed heavy spiders use a stainless steel casing that does not compromise the primary function of providing a suitable structure for coupling the control rods to the lower end of the connecting rod. At the same time, the stainless steel casing leaves sufficient void or cavity volume to allow a filler comprising a heavy material to be inserted. Although stainless steel is referenced as a preferred material for the casing, it is to be understood that other materials having desired structural characteristics and reactor pressure vessel compatibility can also be used. The filler comprising heavy material is suitably tungsten, depleted uranium, or another suitably dense material.

Figure 9:
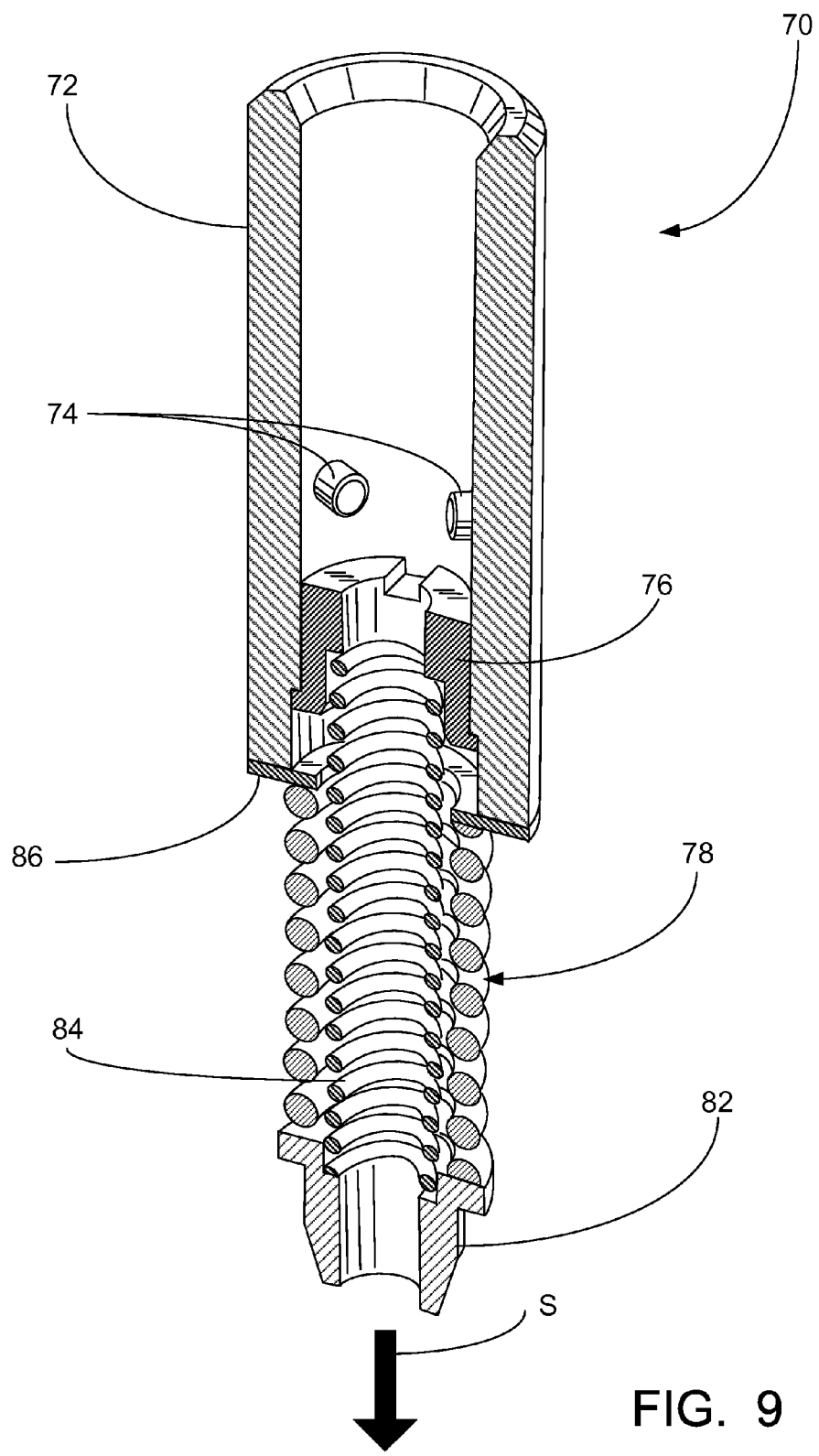
FIG. 9 diagrammatically shows a perspective sectional view of the J-Lock female attachment assembly housed or disposed in the central passage of the terminal weighting element of FIGS. 5-7.
Figure 10:
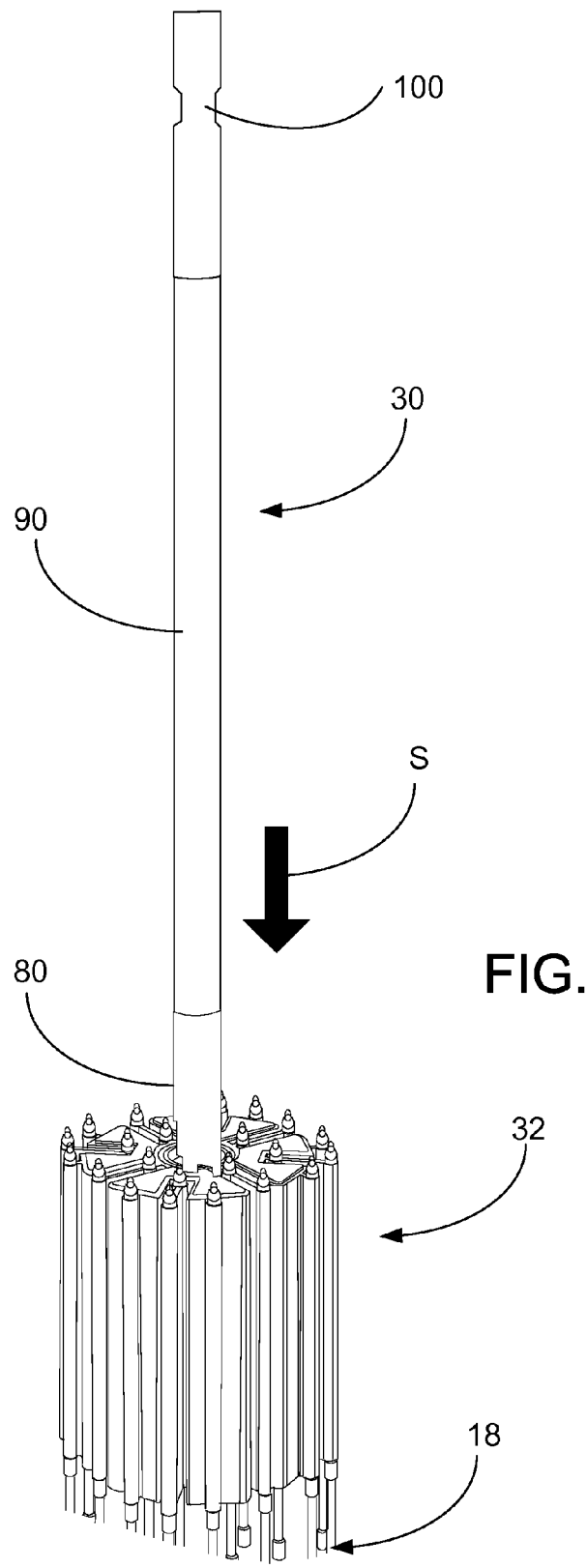
FIG. 10 diagrammatically shows a perspective view of the assembly of the connecting rod, terminal weighting element, and control rods including an upper portion of the J-Lock coupling.
Figure 11:
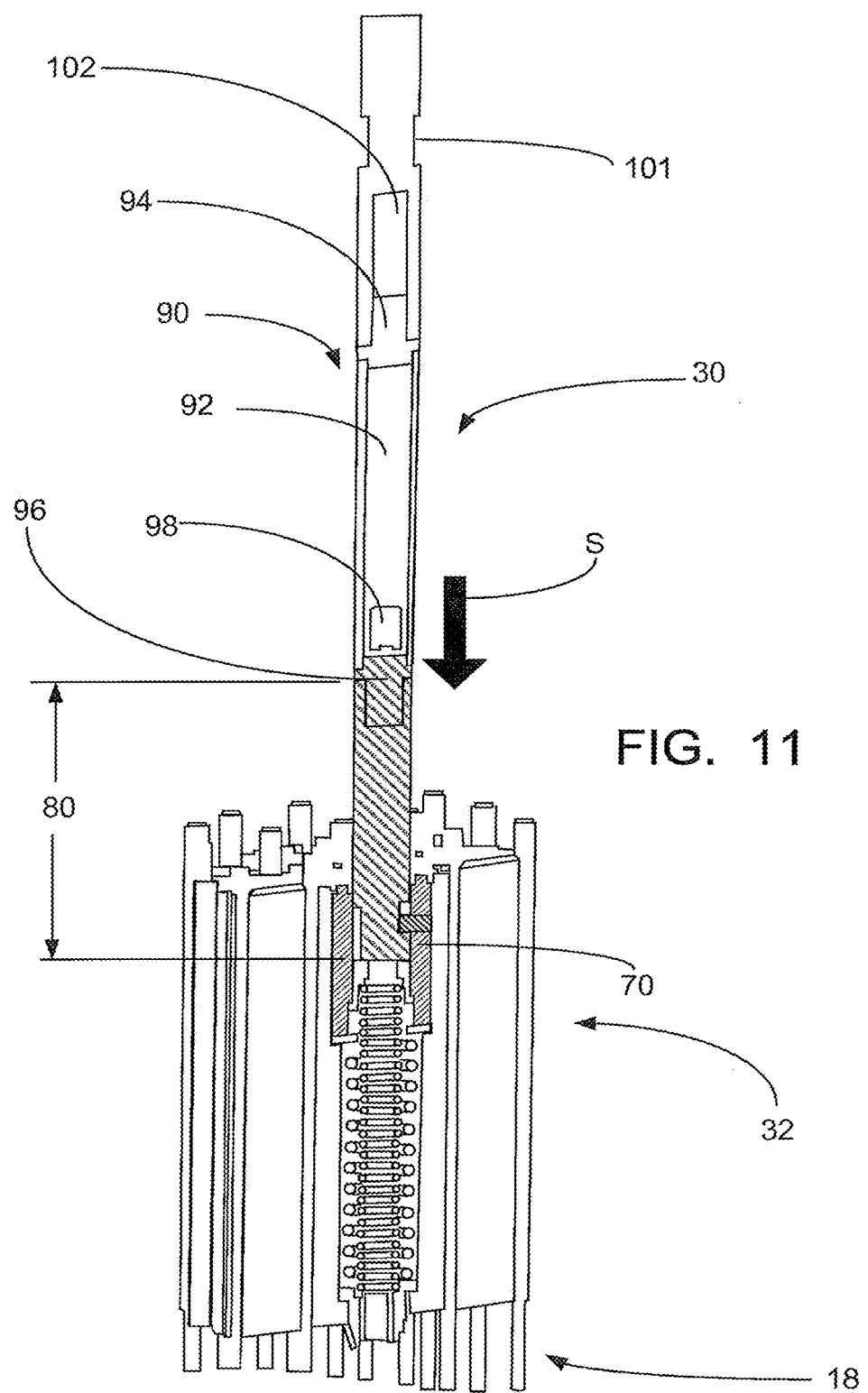
FIG. 11 diagrammatically shows a perspective sectional view of the assembly of the connecting rod, terminal weighting element, and control rods including details of the J-Lock coupling in its locked configuration.

With reference to FIGS. 9, 10, and 11, various attachment configurations can be used for securing the connecting rod 30 in the attachment passage 50 of the casing 40 of the heavy spider 32. In an illustrative example of one such attachment configuration, the central passage 50 of the casing 40 houses a J-Lock female attachment assembly 70, which is suitably coaxially disposed inside the central passage 50 of the casing 40. FIG. 9 illustrates a side sectional view of the J-Lock female attachment assembly 70, while FIG. 10 shows a side view of the connected assembly and FIG. 11 shows a side sectional view of the connected assembly. With particular reference to FIG. 9, the illustrative J-Lock female attachment assembly 70 includes a hub 72 which in the illustrative embodiment comprises a round cylinder coaxially welded or otherwise secured in the central passage 50 of the casing 40. Alternatively, the hub may be integral with or defined by an inside surface of the central passage 50. The hub 72 serves as an interface between the casing 40 and the J-Lock female attachment components, which include three J-Lock pins 74 (two of which visible in the sectional view of FIG. 9) disposed inside of the hub 72. These pins 74 provide the connection points for a J-Lock male attachment assembly 80 (see FIG. 11) disposed at the lower end of the connecting rod 30. A J-Lock plunger 76 and a J-Lock spring 84 keeps the J-Lock male attachment assembly 80 of the connecting rod 30 in place once it has been engaged with the heavy spider 32. (Locked arrangement shown in FIG. 11).

The illustrative J-Lock female attachment assembly 70 further includes a lower plunger 82, an inner spring 78, and a spring washer 86 which cooperate to absorb the impact of the lower translating assembly (that is, the translating combination of the control rods 18, the heavy spider 32, the connecting rod 30, and optionally a lead screw (not shown)) during a SCRAM. As will be appreciated, the lower plunger 82 is mounted within the attachment passage (bore) 50 of the casing 40 of the heavy spider 32, and protrudes from a bottom surface of the heavy spider 32 for engagement with another surface during a SCRAM event. The lower plunger 82 is supported for reciprocating movement within the attachment passage 50, and biased downwardly by spring 78 and/or J-Lock spring 84. Together, the plunger 82 and spring 78 and/or J-Lock spring 84 comprise a kinetic energy absorbing element supported by the heavy spider 32 for absorbing kinetic energy during a SCRAM event. The kinetic energy absorbing element can be configured to act between the terminal element 32 and an upper plate of an associated fuel assembly, for example, as will be described in more detail below.

The illustrative J-Lock connection between the lower end of the connecting rod 30 and the heavy spider 32 is an example. More generally, substantially any type of connection, including another type of detachable connection or a permanently welded connection or an integral arrangement, is contemplated. The J-Lock arrangement has the advantage of enabling the connecting rod 30 to be detached from the heavy spider 32 (and, hence, from the control rods 18) by a simple "push-and-twist" operation. This allows the connecting rod 30 to be moved separately from the remainder of the translating assembly (that is, the heavy spider 32 and the attached control rods 18) during refueling of the nuclear reactor.

With reference to FIGS. 10 and 11, additional weight for the translating assembly is additionally or alternatively obtained by enhancing the density of the connecting rod 30. Toward this end, the illustrative connecting rod 30 includes a hollow (or partially hollow) connecting rod tube 90 which (as seen in the sectional view of FIG. 11) contains a filler region 92 adapted to accept a filler comprising a heavy material. Thus, the connecting rod tube 90 serves the structural purpose analogous to the casing 40 of the terminal weighting element 32, while the filler comprising heavy material serves a weighting (or average density-enhancing) purpose analogous to the filler 56 of the terminal weighting element 32.

In one suitable embodiment, the filler comprising heavy material is in the form of tungsten slugs each having a diameter substantially coinciding with an inner diameter of the connecting rod tube 90 and being stacked in the connecting rod tube 90, with the number of stacked tungsten slugs being selected to achieve the desired weight. If the number of tungsten slugs is insufficient to fill the interior volume of the connecting rod tube 90 and it is desired to avoid movement of these slugs, then optionally the filler is prevented from shifting by a suitable biasing arrangement or by filling the remaining space within the interior volume of the connecting rod tube 90 with a light weight material such as stainless steel slugs. In the illustrative example of FIG. 11, a biasing arrangement region 98 is employed, in which the interior volume of the connecting rod tube 90 is sealed off by upper and lower welded plugs 94, 96, and a biasing arrangement such as a compressed spring takes up any slack along the SCRAM direction S that may be introduced by incomplete filling of the interior volume of the connecting rod tube 90 by the filler. Instead of tungsten, the heavy material comprising the filler may be depleted uranium, molybdenum, tantalum, or so forth, by way of some other illustrative examples. The filler may comprise one or more solid slugs or rods, a powder, a granulation, or so forth.

With continuing reference to FIGS. 10 and 11, the illustrative connecting rod 30 has an upper end that includes an annular groove 100 for securing with a latch of the CRDM unit 14 (latch not shown), and a magnet 102 for use in conjunction with a control rod position sensor (not shown). A suitable embodiment of the CRDM unit 14 including a motor/lead screw arrangement for continuous (regulating rod) adjustment and a separate latch for detaching the connecting rod 30 from the CRDM unit 14 (with the lead screw remaining operatively connected with the motor) is described in U.S. Pub. No. 2010-0316177 A1 published Dec. 16, 2010 which is incorporated herein by reference in its entirety and in U.S. Pub. No. 2011-0222640 A1 published Sep. 15, 2011 which is incorporated herein by reference in its entirety.

Alternatively, in other embodiments a lead screw (not shown) is secured with or integral with the connecting rod tube 90, and the lead screw SCRAMs together with the connecting rod/terminal weighting element (or spider)/control rod (in other words, the lead screw forms part of the translating assembly during SCRAM). In some such alternative embodiments, the motor is suitably coupled with the lead screw by a separable ball nut that separates to release the lead screw and initiate SCRAM.

If the interior volume of the hollow connecting rod tube 90 is only partially filled by the filler, then stainless steel rods or some other light weight filler (not shown) may be inserted into the remaining interior volume to fill complete the filling.

The filler generally has a lower coefficient of thermal expansion than the stainless steel (or other material) of the hollow connecting rod tube 90. The connecting rod 30 is assembled at room temperature, and then heated to its operating temperature. For a connecting rod having a length of, e.g. 250 centimeters or greater, the thermal expansion will result in the rod tube 90 increasing by an amount of order a few centimeters or more. The lower coefficient of thermal expansion of the filler results in a substantially lower length increase of the filler. The spring in the biasing arrangement region 98 suitably compensates for this effect. Additionally, if the spring is located below the filler, then it can assist in dissipating the kinetic energy of the filler at the termination of the SCRAM drop.

Figure 12:
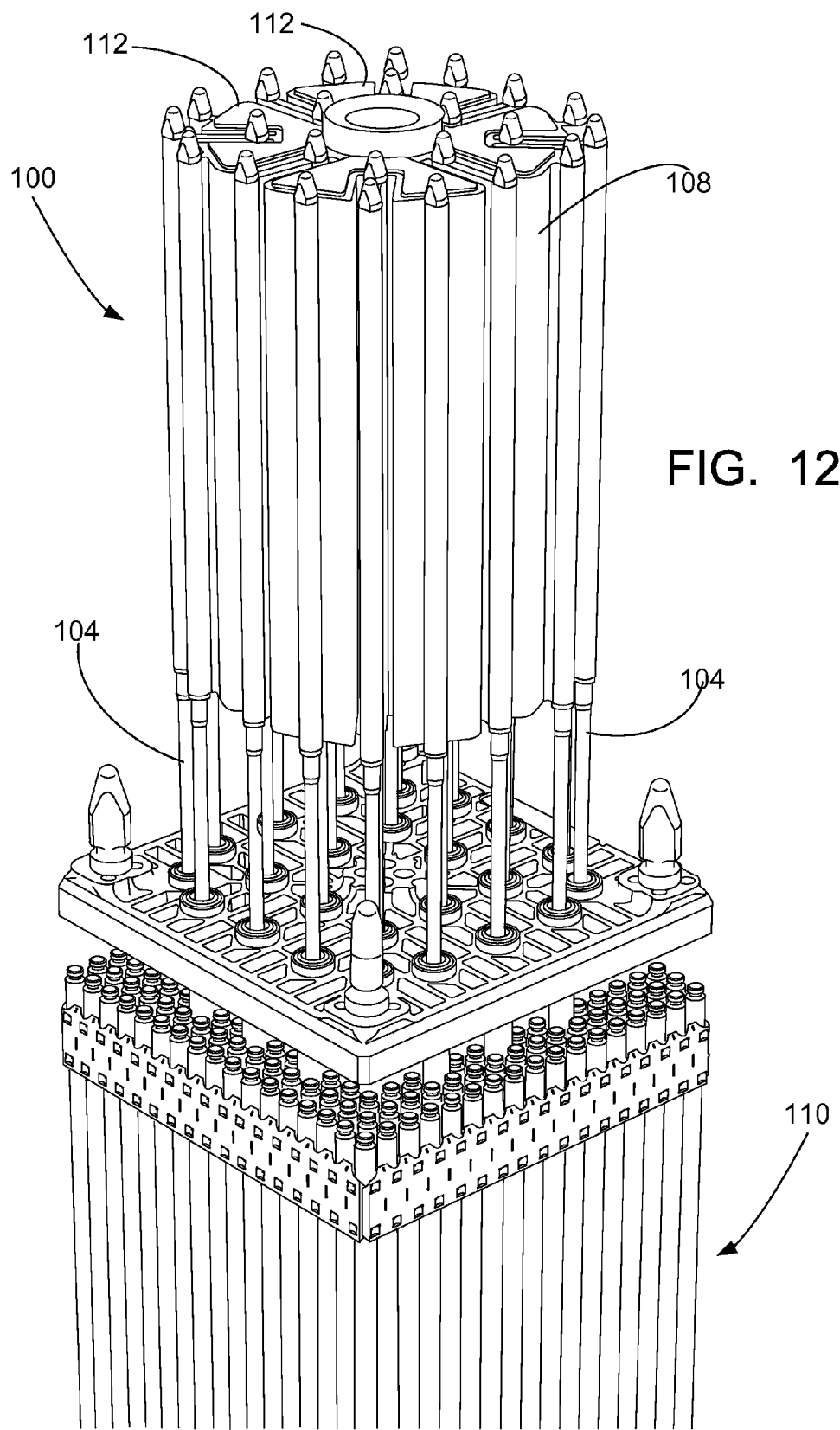
FIG. 12 diagrammatically shows a perspective view of another exemplary CRA in accordance with the disclosure.
Figure 13:
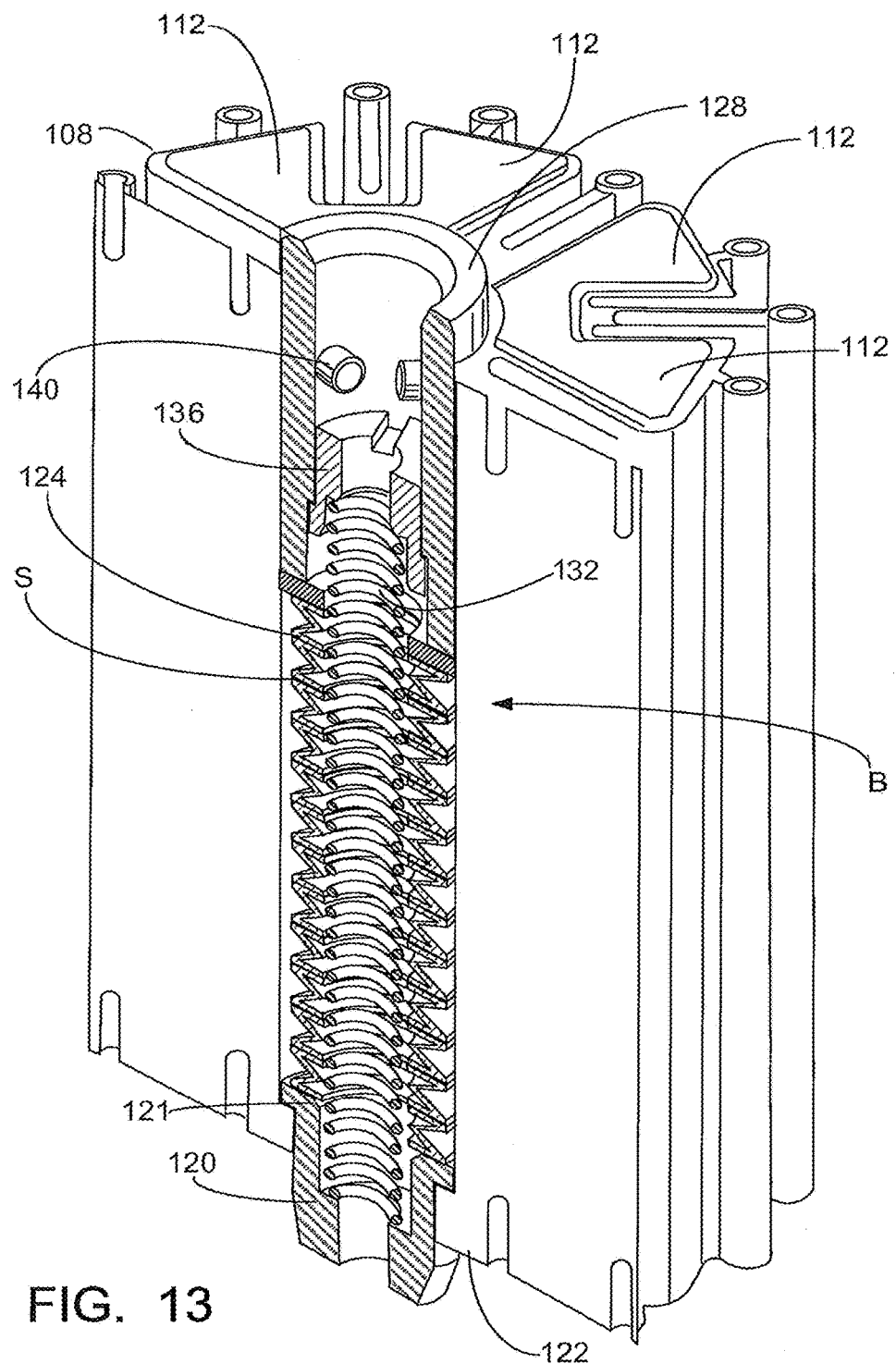
FIG. 13 diagrammatically shows a perspective sectional view of the terminal element of FIG. 12 having a kinetic energy absorbing element including a stack of Belleville washers.

Turning now to FIGS. 12 and 13, and initially to FIG. 12, another exemplary control rod assembly is illustrated and identified generally by reference numeral 100. As will be appreciated, a typical reactor core will have a plurality of control rod assemblies 100. As shown in FIG. 12, the illustrative control rod assembly 100 consists of an array of twenty-three or twenty-four rodlets 104 attached to a spider 108, which may be a relatively massive tungsten-ballasted heavy spider as described herein and as illustrated in FIGS. 12 and 13, or alternatively may be a conventional lightweight spider. Each rod let 104 contains neutron poisons sealed in cladding tubes (e.g., 304L stainless steel) via welded end plugs of the same material. Each control rod assembly 100 is associated with a fuel assembly 110 into which the control rodlets 104 are moved to control operation of the reactor.

In some core designs, the control rod assemblies in the standard control banks use full-length silver-indium-cadmium absorbers in twenty-three or twenty-four rodlets. The control rod assemblies in the shutdown banks have a row of fifteen or sixteen rodlets with B4C absorbers in the outboard positions surrounding eight inboard rodlets with standard silver-indium-cadmium absorbers. These are merely illustrative examples.

The array of rodlets 104 are mechanically fastened to the arms 112 of the spider 108 by threading extensions on the top end plugs into tapped receiving holes in the bottom of the spider arms 112 and then lock welding them to the spider 108 so they cannot back out. Tapered "nuts" are threaded into similar tapped receiving holes in the top surface of the spider arms to serve as lead-ins when the control rods 104 are withdrawn from the core upward through the reactor internals guide structure. The "nuts" are also lock-welded to the spider to prevent them from backing off during operation. A reduced-diameter section in the top end plugs allows the rodlets 104 to flex relative to the spider 108 as necessary to accommodate any misalignment between a fuel assembly 110 and the rod guide structure.

During operation of a reactor, the control rod assemblies 100 in the shutdown banks are typically fully withdrawn from the core, while the regulating control rod assemblies may be partially inserted into the core and their axial position changed with time. When a SCRAM occurs, the connecting rods (not shown in FIG. 12, but described above) are released and the control rod assemblies 104 fall into the core under gravity, reaching a terminal velocity of approximately 12 feet per second if they are fully withdrawn prior to the SCRAM. When a control rod assembly 104 is approximately 75% inserted into the corresponding fuel assembly 110 during a SCRAM, the tips of the rodlets 104 enter dashpot tubes (not shown) installed in the bottom of the control rod guide tubes of the fuel assembly 110. These small dashpot tubes have a significantly smaller inside diameter than the larger control rod guide tubes, greatly reducing the radial clearance with the control rodlets 104. This produces a piston effect as water is forced to flow through the resulting narrow annulus, slowing the falling control rod assemblies. However, the downward motion continues until eventually the spider 108 on the falling control rod assembly impacts the top of the fuel assembly 110. An impact limiter, also referred to as a kinetic energy absorbing element, accommodates the remaining kinetic energy.

Turning to FIG. 13, the kinetic energy absorbing element includes a cup-like spider plunger 120 that is preloaded against the bottom of the spider central bore B by two concentric spring features. Plunger 120 includes a radially outwardly extending flange 121 that is configured to engage a shoulder 122 of central bore B to limit further downward axial movement of the plunger 120 from the position shown in FIG. 13.

A relatively stronger, outer spring feature is comprised of a stack S of Belleville washers (also called Belleville springs) 124, such as age-hardened Inconel-718 Belleville washers. The stack S of Belleville washers 124 provides the majority of the preload on the plunger 120. The Belleville washer stack S reacts against a hub 128 which is welded into the top of the central bore B and contains a J-lock mechanism 136 that mates with a coupling mechanism on the bottom end of a connecting rod, (not shown). The relatively weaker inner spring 132 is a conventional helical compression spring made of, for example, age-hardened Inconel-718 wire, which reacts against a J-lock plunger 136. The Belleville washer stack S and the coil spring 132 are coaxially aligned and are axially coextensive along at least a portion of their respective lengths resulting in a compact arrangement. When the connecting rod engages the spider 108, the plunger 136 is depressed sufficiently to enable the coupling mechanism of the connecting rod to pass under J-lock pins 140 in the hub 128 and rotate to the locked position (e.g., as described above).

During a scram, the kinetic energy absorbing element 120, S acts between the spider 32 and an associated impact surface, such as an upper plate of an associated fuel assembly, or an upper core plate (not shown) spanning the space above the fuel assemblies making up the reactor core. The Belleville washer stack S provides a higher load capability in a more compact arrangement than can be achieved using a conventional helical compression spring. This allows the kinetic energy absorbing element to absorb more energy than would otherwise be possible given the limited volume available in the spider hub. This high energy capability particularly well-suited to applications where a massive tungsten ballasted spider, such as that set forth above, is used, and more generally is well-suited to applications in which the overall translating control rod assembly is heavy, e.g. due to the use of long control rods, a long connecting rod, a heavy spider, various combinations thereof, and so forth.

It will be appreciated that the amount of energy the impact limiter must absorb depends on the mass of the falling assembly and its velocity, which in turn depends on how far it falls and on the fluid resistance imparted by travel through the primary coolant. Everything else being equal, a longer control rod assembly will fall further from the fully withdrawn position, and impact the fuel assembly with greater energy. The capability of the kinetic energy absorbing element to absorb this energy can be adjusted by tailoring the Belleville washer stack S.

Turning to FIGS. 14a-14f, various Belleville washer stacks S suitably used as the stack S of FIG. 13 are illustrated. The plunger stroke, stiffness, and maximum load capability of the kinetic energy absorbing element can be customized utilizing several different approaches. For example:

Decreasing the number of Belleville washers in the stack S as illustrated in FIG. 14a, without changing their geometry or material of construction, will result in a kinetic energy absorbing element having a shorter allowable plunger stroke and a higher stiffness with the same maximum load capability.

Conversely, increasing the number of Belleville washers in the stack S as illustrated in FIG. 14b, without changing their geometry or material of construction, will result in a kinetic energy absorbing element having a longer allowable plunger stroke and a lower stiffness with the same maximum load capability.

Using thicker Belleville washers in the stack S as illustrated in FIG. 14c will result in an kinetic energy absorbing element having a shorter allowable plunger stroke, a higher stiffness, and a higher allowable load.

Conversely, employing thinner Belleville washers in the stack S as illustrated in FIG. 14d will yield a design with a longer allowable plunger stroke, a lower stiffness, and a lower allowable load.

It is also possible to tailor the kinetic energy absorbing element characteristics by changing the nesting arrangement of the Belleville washers. FIGS. 14a-14d all show a stacking arrangement in which the orientation of each Belleville washer is reversed relative to the Belleville washer above and below it. This alternating stacking arrangement maximizes the allowable stroke while minimizing the stiffness and allowable load of the kinetic energy absorbing element. If instead, the same Belleville washers are stacked in pairs as illustrated in FIG. 14e, with the washers in each pair nested together in the same orientation and each pair of washers then oriented the reverse of the neighboring pair above and below, the allowable stroke of the kinetic energy absorbing element will be cut in half, the stiffness will be doubled, and the allowable load will be doubled.

If instead, the same Belleville washers are stacked in sets of three as illustrated in FIG. 14f, with the washers in each set again nested together in the same orientation and each set of three washers then oriented the reverse of the neighboring set of three washers above and below, the allowable stroke of the kinetic energy absorbing element will be cut by two thirds, the stiffness will be tripled, and the allowable load will be tripled.

The same principle can be extended to Belleville washers arranged in sets of four, five, etc.; each increase in the number of washers nested together resulting in a proportional decrease in the allowable stroke of the kinetic energy absorbing element and proportional increases in the stiffness and allowable load.

Although the kinetic energy absorbing elements disclosed herein have been described in the context of weighted terminal elements or elongated terminal elements (i.e., heavy spiders), it should be appreciated that aspects of the disclosure are applicable to conventional spider assemblies as well.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. An apparatus comprising:
a spider including a casing having an upper surface and a lower surface, the spider being connectable with a lower end of an associated connecting rod of an associated CRDM and with upper ends of a plurality of associated control rods;
a J-lock attachment assembly including a female attachment assembly, a male attachment assembly and a first plunger, the female attachment assembly being fixed with respect to the spider, the male attachment assembly being mounted to the connecting rod and configured to selectively engage the female locking assembly, and the first plunger being mounted to the spider for reciprocating movement with respect to the spider so that the first plunger exerts upward force on the male locking assembly when the male locking assembly is engaged with the female locking assembly; and
a kinetic energy absorbing element including a second plunger mounted to the spider for reciprocating movement, a first spring and a second spring supported by the spider for absorbing kinetic energy during a SCRAM event;
wherein the second plunger protrudes from the lower surface of the casing for engagement with another surface during the SCRAM event, and
wherein the first spring and the second spring are coaxially aligned, are axially coextensive along at least a portion of their respective lengths, the first spring has a first end that abuts the first plunger and a second end that abuts the second plunger, and the second spring has a first end that is axially fixed with respect to the spider and a second end that abuts the second plunger.

2. The apparatus as set forth in claim 1, wherein the second plunger is supported in a bore of the spider, said bore opening to the lower surface of the casing, and wherein the second spring is interposed between the plunger and the casing of the spider for biasing the plunger away from the top surface of the casing.

3. The apparatus as set forth in claim 1, wherein the casing includes a bore extending axially between the upper surface and the lower surface thereof, the female attachment assembly and the first plunger being supported in the bore.

4. The apparatus as set forth in claim 3, wherein the second plunger is supported within the bore of the spider.

5. The apparatus as set forth in claim 4, wherein the second plunger is biased away from the upper surface of the casing by the second spring which is interposed between the second plunger and the female coupling member.

6. The apparatus as set forth in claim 1, wherein the spider has an elongation in a SCRAM direction that is at least as large as a largest dimension of the spider transverse to the SCRAM direction.

7. The apparatus of claim 1, wherein one of the first spring and the second spring further comprises a stack of Belleville washers.

8. The apparatus of claim 1, wherein the first spring and the second spring bias the plunger away from the top surface of the casing.

9. An apparatus comprising:
a spider having a casing with an upper surface and a lower surface, the spider being configured to connect with a connecting rod of a CRDM and support a plurality of mutually parallel control rods;
a J-lock attachment assembly including a female attachment assembly, a male attachment assembly and a first plunger, the female attachment assembly being fixed with respect to the spider, the male attachment assembly being mounted to the connecting rod and configured to selectively engage the female locking assembly, and the first plunger being mounted to the spider for reciprocating movement with respect to the spider so that the first plunger exerts upward force on the male locking assembly when the male locking assembly is engaged with the female locking assembly; and
a kinetic energy absorbing element disposed at least partially in a central bore of the spider and including a first spring, a second spring and a second plunger arranged to stop descent of the spider during a SCRAM event with kinetic energy developed during the SCRAM event being absorbed by the kinetic energy absorbing element disposed in the central bore of the spider;
wherein the second plunger protrudes from the lower surface of the casing for engagement with another surface during the SCRAM event, and
wherein the first spring and the second spring are coaxially aligned, are axially coextensive along at least a portion of their respective lengths, the first spring has a first end that abuts the first plunger and a second end that abuts the second plunger, and the second spring has a first end that is axially fixed with respect to the spider and a second end that abuts the second plunger.

10. The apparatus of claim 9 wherein one of the first spring and the second spring of the kinetic energy absorbing element further comprises a stack of Belleville washers disposed in a central bore of the spider.

11. The apparatus of claim 10 wherein the stack of Belleville washers does not extend outside of the central bore of the spider.

12. The apparatus of claim 10 further comprising:
a plurality of mutually parallel control rods having ends connected with the spider and extending away from the spider in a first direction.

13. The apparatus of claim 12 further comprising:
a control rod drive mechanism (CRDM) detachably engaging the connecting rod wherein detachment of the connecting rod from the CRDM initiates a SCRAM event.

* * * * *

UNITED STATES PATENT AND TRADEMARK OFFICE
CERTIFICATE OF CORRECTION

PATENT NO. : 10,102,933 B2
APPLICATION NO. : 13/553023
DATED : October 16, 2018
INVENTOR(S) : Lewis A. Walton et al.

Page 1 of 1

It is certified that error appears in the above-identified patent and that said Letters Patent is hereby corrected as shown below:

In the Specification

Column 1, Line 6, please change "15" to --13--.

Column 11, Line 1, please delete "rod let" and insert --rodlet--.

Column 12, Line 45, please delete "stacks" and insert --stack--.

Signed and Sealed this
Thirteenth Day of August, 2019

Andrei Iancu
*Director of the United States Patent and Trademark Office*